US010606129B2

(12) United States Patent
Lee et al.

(10) Patent No.: US 10,606,129 B2
(45) Date of Patent: Mar. 31, 2020

(54) METHOD OF MANUFACTURING A DISPLAY PANEL WITH CONCAVO-CONVEX STRUCTURE SUBSTRATE COUPLING

(71) Applicant: Samsung Display Co., Ltd., Yongin-si (KR)

(72) Inventors: Eung-Gyu Lee, Cheonan-si (KR); JinSuek Kim, Daejeon (KR); Hyeran Mun, Yangju-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 15/859,713

(22) Filed: Jan. 1, 2018

(65) Prior Publication Data
US 2018/0120606 A1    May 3, 2018

Related U.S. Application Data

(62) Division of application No. 14/447,059, filed on Jul. 30, 2014, now Pat. No. 9,891,475.

(30) Foreign Application Priority Data

Dec. 30, 2013   (KR) .................. 10-2013-0167190

(51) Int. Cl.
*G02F 1/1339*   (2006.01)
*G02F 1/1335*   (2006.01)

(52) U.S. Cl.
CPC ...... *G02F 1/1339* (2013.01); *G02F 1/133512* (2013.01); *G02F 1/13394* (2013.01)

(58) Field of Classification Search
CPC combination set(s) only.
See application file for complete search history.

(56) References Cited

U.S. PATENT DOCUMENTS 6,704,072 B2   3/2004   Jeong et al.
6,839,122 B2   1/2005   Chung et al.
(Continued)

FOREIGN PATENT DOCUMENTS

JP   05-072540      3/1993
JP   2010-020069    1/2010
(Continued)

OTHER PUBLICATIONS

Non Final Office Action dated Jul. 28, 2016, in U.S. Appl. No. 14/447,059.

(Continued)

*Primary Examiner* — Lauren Nguyen
(74) *Attorney, Agent, or Firm* — H.C. Park & Associates, PLC

(57) ABSTRACT

A display apparatus includes a first display substrate, a second display substrate, a coupling member interposed between the first display substrate and the second display substrate in a seal line area to couple the first display substrate and the second display substrate, a contact structure interposed between the coupling member and at least one of the display substrates in the seal line area, the contact structure having a concavo-convex shaped surface in contact with the coupling member, and the contact structure includes a moisture trap area and a moisture barrier area, and an electrode layer disposed on the moisture trap area but not on the moisture barrier area, and configured to contact portions of the coupling member in the seal line area.

8 Claims, 13 Drawing Sheets

(56) References Cited

U.S. PATENT DOCUMENTS

| | | |
|---|---|---|
| 7,180,566 B2 | 2/2007 | Lee |
| 7,486,368 B2 | 2/2009 | Sakakura et al. |
| 7,535,538 B2 | 5/2009 | Yamada et al. |
| 7,795,803 B2 | 9/2010 | Kim et al. |
| 7,952,678 B2 | 5/2011 | Chan et al. |
| 8,045,122 B2 | 10/2011 | Kang et al. |
| 8,111,369 B2 | 4/2012 | Shin |
| 8,421,983 B2 | 4/2013 | Jung et al. |
| 2006/0262267 A1* | 11/2006 | Sekiguchi ......... G02F 1/133734 349/187 |
| 2008/0129946 A1* | 6/2008 | Chan ................ G02F 1/1339 349/153 |
| 2009/0322979 A1 | 12/2009 | Kang et al. |
| 2012/0002145 A1 | 1/2012 | Lee et al. |
| 2012/0033150 A1* | 2/2012 | Kim ................ G02F 1/1339 349/43 |
| 2012/0320327 A1 | 12/2012 | Park et al. |
| 2012/0327355 A1 | 12/2012 | Cheng et al. |

FOREIGN PATENT DOCUMENTS

| | | |
|---|---|---|
| JP | 2012-108283 | 6/2012 |
| KR | 10-2004-0083595 | 10/2004 |
| KR | 10-2007-0073479 | 7/2007 |
| KR | 10-0841629 | 6/2008 |

OTHER PUBLICATIONS

Final Office Action dated Dec. 14, 2016, in U.S. Appl. No. 14/447,059.
Non Final Office Action dated May 4, 2017, in U.S. Appl. No. 14/447,059.
Notice of Allowance dated Oct. 2, 2017, in U.S. Appl. No. 14/447,059.

* cited by examiner

METHOD OF MANUFACTURING A DISPLAY PANEL WITH CONCAVO-CONVEX STRUCTURE SUBSTRATE COUPLING

CROSS-REFERENCE TO RELATED APPLICATION

This application is a Divisional of U.S. patent application Ser. No. 14/447,059, filed on Jul. 30, 2014, and claims priority from and the benefit of Korean Patent Application No. 10-2013-0167190, filed on Dec. 30, 2013, each of which is hereby incorporated by reference for all propose as if fully set forth herein.

BACKGROUND

Field

The present disclosure relates to a display panel and a method of manufacturing the same. More particularly, the present disclosure relates to a display panel having improved adhesive strength and a method of manufacturing the display panel having the improved adhesive strength.

Discussion of the Background

In general, a liquid crystal display includes a liquid crystal display panel. The liquid crystal display panel includes a thin film transistor substrate, a color filter substrate, a liquid crystal layer interposed between the thin film transistor substrate and the color filter substrate, and a sealant interposed between the thin film transistor substrate and the color filter substrate. The sealant couples the thin film transistor substrate and the color filter substrate.

However, when adhesion between the sealant, each of the thin film transistor substrate, and the color filter substrate is degraded, the sealant may be delaminated from the substrates when a mechanical stress is applied to the substrates.

In particular, the delamination phenomenon frequently occurs in displays having a narrow bezel structure, which has a narrower bezel width surrounding an active area of the liquid crystal display panel than a conventional display structure, since a width of the sealant may be insufficient.

SUMMARY

Exemplary embodiments of the present invention provide a display panel having improved adhesive strength, which impedes moisture from entering thereto, to improve reliability thereof.

Exemplary embodiments of the present invention provide a method for manufacturing a display panel with improved adhesive strength.

Additional features of the invention will be set forth in the description which follows, and in part will be apparent from the description, or may be learned by practice of the invention.

Exemplary embodiments of the present invention provide a display panel including a first display substrate, a second display substrate, a coupling member interposed between the first display substrate and the second display substrate in a seal line area to couple the first display substrate and the second display substrate, an image display device interposed between the first display substrate and the second display substrate, a contact structure interposed between the coupling member and at least one of the display substrates in the seal line area, the contact structure having a concavo-convex shaped surface in contact with the coupling member, and the contact structure includes a moisture trap area and a moisture barrier area, and an electrode layer disposed on the moisture trap area but not on the moisture barrier area, and configured to contact portions of the coupling member in the seal line area.

Exemplary embodiments of the present invention provide a method for manufacturing a display panel, including disposing a first display substrate, disposing a second display substrate, interposing an image display device between the first display substrate and the second display substrate, interposing a coupling member in a seal line area between the first display substrate and the second display substrate for coupling the first display substrate and the second display substrate, interposing a contact structure between the coupling member and at least one of the display substrates in the seal line area, the contact structure having a concavo-convex shaped surface in contact with the coupling member, and the contact structure includes a moisture trap area and a moisture barrier area, and disposing an electrode layer on the moisture trap area but not on the moisture barrier area, wherein the electrode layer contacts portions of the coupling member in the seal line area.

Exemplary embodiments of the present invention provide a display panel, including a first display substrate, a second display substrate, a coupling member interposed between the first display substrate and the second display substrate, and an image display device interposed between the first display substrate and the second display substrate, in which at least one of the first display substrate and the second display substrate has a plurality of protrusions on its surface in contact with the coupling member.

According to exemplary embodiments of the present invention, contact area between the display substrates and the coupling member may be increased by a contact structure having a concavo-concave shaped surface. The increase in the contact area may improve the adhesive strength of the display substrates.

According to aspects of the invention, an electrode layer having a discontinuous interface is disposed in a seal line area in a display panel to provide a moisture trap area and a moisture barrier area to impede or prevent moisture from entering into the inside of the display panel.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
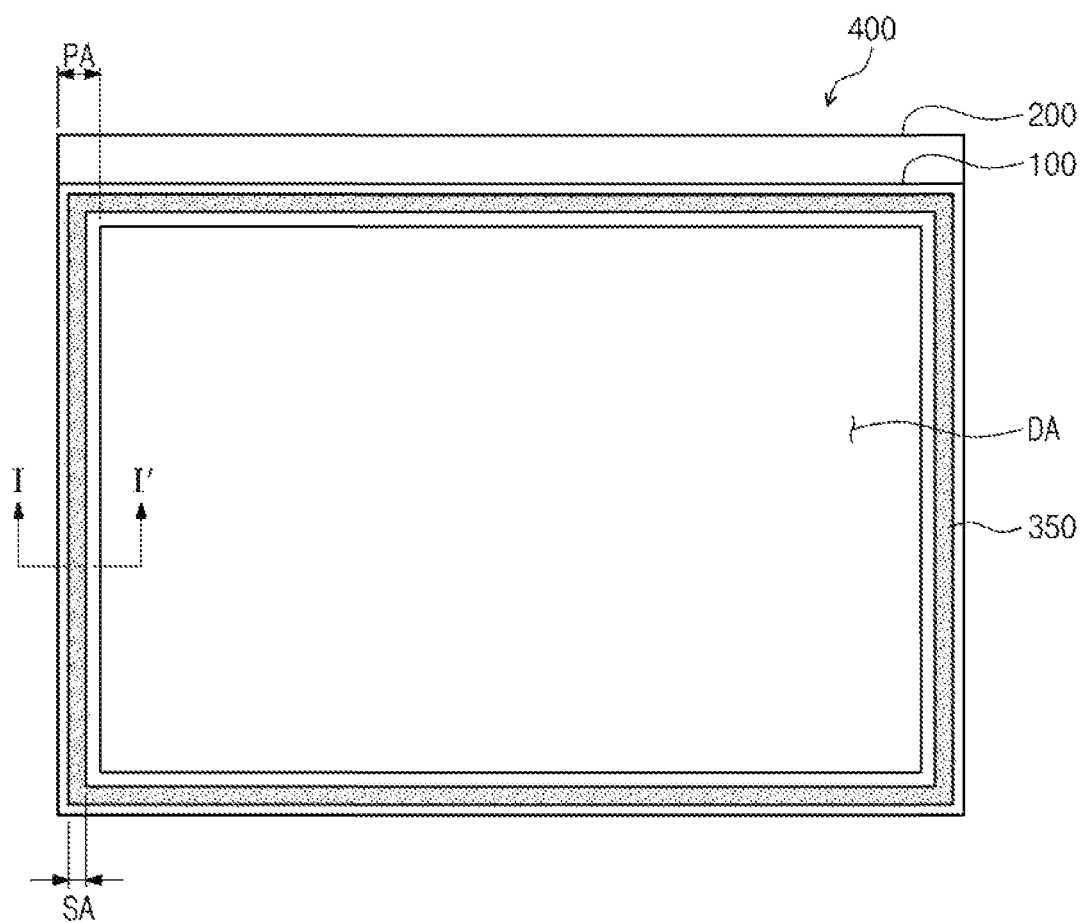
FIG. 1 is a plan view illustrating a display substrate according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, no intervening elements or layers may be present. Like numbers refer to like elements throughout. As used herein, the term "and/or" may include any and all combinations of one or more of the associated listed items.

It will also be understood that, although the terms first, second, etc. may be used herein to describe various elements, components, regions, layers and/or sections, these elements, components, regions, layers and/or sections are not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's spatial relationship to another element or feature as illustrated in the figures. It will be understood that the spatially relative terms may encompass different orientations of the device in use or operation in addition to the orientation depicted in the figures. For example, if the device in the figures is turned over, elements described as being located "below" or "beneath" other elements or features would then be oriented to be "above" the other elements or features. Thus, the exemplary term "below" can encompass both a relative orientation of above and below with respect to a reference element or feature. The device may be otherwise oriented (e.g., rotated 90 degrees or at other orientations) and the spatially relative descriptors used herein may be interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise specified, various terms (including technical and scientific terms) used herein may have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various aspects of the present invention will be explained in more detail with reference to the accompanying drawings.

Figure 2:
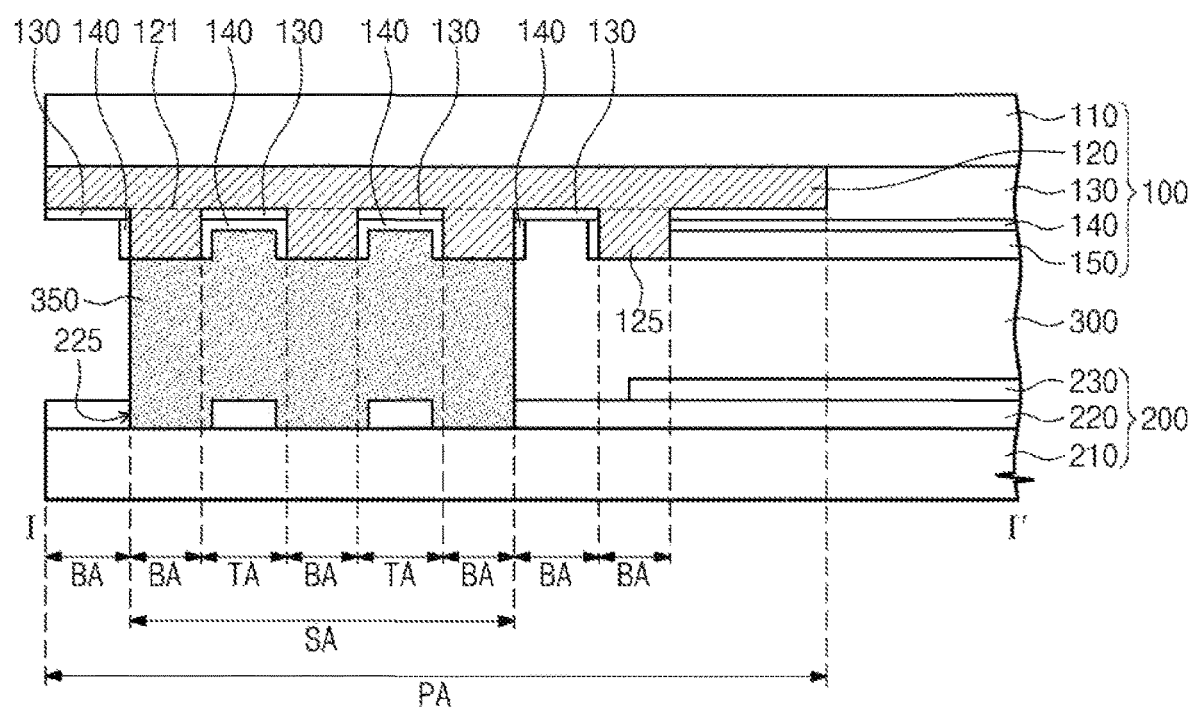
FIG. 2 is a cross-sectional view of the display substrate of FIG. 1 taken along a line I-I'.

FIG. 1 is a plan view illustrating a display substrate according to an exemplary embodiment of the present invention. FIG. 2 is a cross-sectional view of the display substrate of FIG. 1 taken along a line I-I' shown in FIG. 1.

Referring to FIG. 1, a display panel 400 includes a first display substrate 100, a second display substrate 200, a coupling member 350 interposed between the first display substrate 100 and the second display substrate 200, and a gray control layer 300 interposed between the first display substrate 100 and the second display substrate 200.

The display panel 400 includes a display area DA and a peripheral area PA, which may be located adjacent to the display area DA. The display area DA may display an image and the peripheral area PA may surround the display area DA. The peripheral area PA may block light passing through the display area DA.

The coupling member 350 is disposed in the peripheral area PA to couple the first display substrate 100 and the second display substrate 200. The coupling member 350 is disposed along the peripheral area PA to have a closed loop shape. The area in which the coupling member 350 is disposed in may be referred to as a seal line area SA. The seal line area SA may have a width smaller than that of the peripheral area PA.

The gray control layer 300 is interposed between the first display substrate 100 and the second display substrate 200 in at least the display area DA. The gray control layer 300 may include, without limitation, a liquid crystal device, an electrowetting device, an electrophoretic device, and the like.

Referring to FIG. 2, the first display substrate 100 includes a first base substrate 110, a light blocking layer 120, a plurality of protrusions 125, an overcoating layer 130, and an electrode layer 140.

The first base substrate 110 may be a transparent glass substrate or a transparent flexible substrate. The light blocking layer 120 is disposed on the first base substrate 110 in the peripheral area PA. The light blocking layer 120 may include an organic insulating material having a light blocking property. Although not illustrated, the light blocking layer 120 may be disposed on the first base substrate 110 in a non-effective display area of the display area DA. According to aspects of the invention, the light blocking layer 120 may be a contact structure, which may be interposed between at least one of the display substrates and the coupling member. Further, the contact structure may have a cancavo-convex shaped surface (e.g., protruding portions and gaps between the protruding portions), which may increase a contact area between the contact structure and a surface of at least one of the display substrates and the coupling member.

The protrusions 125 are protruded from a first surface 121 of the light blocking layer 120. The protrusions 125 may include the same material as that of the light blocking layer 120. The protrusions 125 may be a portion of the blocking layer 120. The protrusions 125 are disposed in the seal line area SA, and the number of the protrusions 125 disposed in the seal line area SA may vary and are not be limited to the number of the protrusions shown in FIG. 2.

The protrusions 125 may increase a contact area between the first display substrate 100 and the coupling member 350. The size of the contact area may exert influence on the adhesive strength between the coupling member 350 and the first display substrate 100. When the contact area increases, the adhesive strength between the coupling member 350 and the first display substrate 100 may increase. More particularly, the adhesive strength between the coupling member 350 and the first display substrate 100 may be increased to prevent against or resist from degradation since the contact area of the coupling member 350 with respect to the first display substrate 100 may increase by the protrusions 125.

In addition, the contact area may be increased or decreased based on a height of the protrusions 125. More specifically, when the height of the protrusions 125 is increased, the contact area may also be increased.

Although not shown in figures, a color filter layer may be formed or disposed on the first base substrate 110 in the display area DA. The color filter layer may include red, green, and blue color pixels and portions of the light blocking layer 120 may be disposed in boundaries between the color pixels. To compensate for a step difference between the light blocking layer 120 and the color pixels, the overcoating layer 130 may be disposed on the light blocking layer 120 and the color filter layer. When the color filter layer is disposed on the second display substrate 200, the overcoating layer 130 may be disposed to at least partially cover or overlap the light blocking layer 120 and the first base substrate 110 to compensate for a step difference between the light blocking layer 120 and the first base substrate 110. The overcoating layer 130 may include, without limitation, a transparent organic material.

As shown in FIG. 2, the overcoating layer 130 is disposed on the first surface of the light blocking layer 120. The overcoating layer 130 is disposed on portions of the light blocking layer 120 located between the protrusions 125, but not on the protrusions 125. Protrusions 125 are disposed in the peripheral area PA.

The electrode layer 140 is disposed on the overcoating layer 130. The electrode layer 140 may include a transparent conductive oxide, such as indium tin oxide (ITO). Further, the electrode layer 140 may be transparent.

Although not shown in figures, the electrode layer 140 may be provided on the overcoating layer 130 and integrally formed or configured with the overcoating layer 130 as a single unitary unit or individually configured as separate units in the display area DA. Further, the electrode layer 140 may be patterned or processed to include openings formed or disposed therethrough.

Portions of the electrode layer 140 is partially removed in the peripheral area PA to provide a plurality of moisture trap areas TA and a plurality of moisture barrier areas BA. The moisture trap areas TA may correspond to areas in which the electrode layer 140 is formed or disposed and the moisture barrier areas BA may correspond to areas where the electrode layer 140 is not disposed. Further, the moisture barrier areas BA may correspond to areas in which protrusions 125 or a convex shaped portion is present, and the moisture trap areas TA may correspond to gaps between the protrusion 125 or a concave shaped portion.

In the following descriptions, an interface portion may refer to a surface of the electrode layer 140, which makes contact with a surface of the coupling member 350 in the peripheral area PA.

Figure 3A:
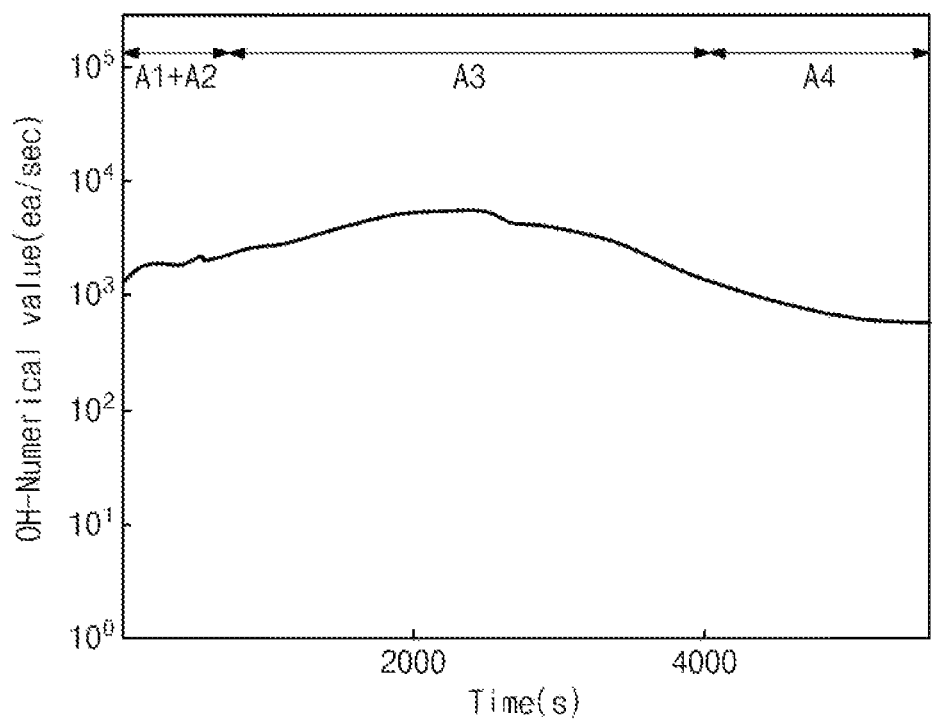
FIG. 3A is a graph illustrating a moisture vapor permeability of various layers located at a seal line area of the display substrate illustrated in FIG. 2.
Figure 3B:
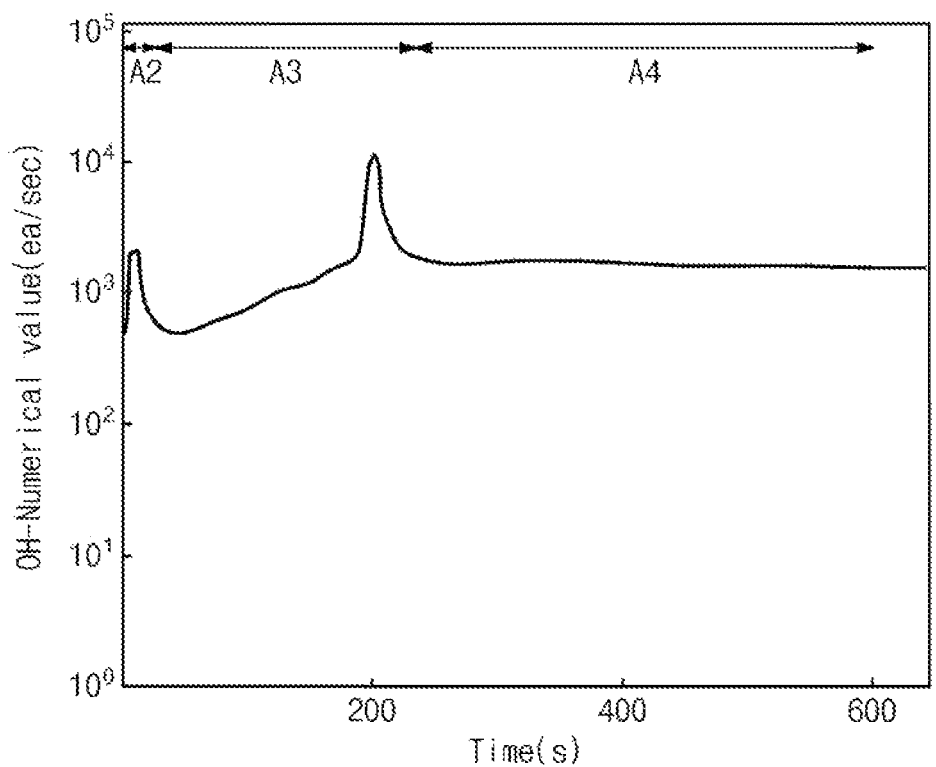
FIG. 3B is a graph illustrating a moisture vapor permeability of various layers located at a peripheral area of the display substrate illustrated in FIG. 2.

FIG. 3A is a graph illustrating a moisture vapor permeability of various layers located at a seal line area of the display substrate illustrated in FIG. 2. FIG. 3B is a graph illustrating a moisture vapor permeability of various layers located at a peripheral area, excluding a seal line area, of the display substrate illustrated in FIG. 2.

In FIG. 3A and FIG. 3B, x-axis represents time in seconds (s) and y-axis represents a numerical value of OH—(ea/sec). In FIG. 3A and FIG. 3B, the coupling member 350 may be measured in a first area A1, a first alignment layer 150 may be measured in a second area A2, the electrode layer 140 may be measured in a third area A3, and the overcoating area 130 may be measured in a fourth area A4.

Referring to FIG. 3A and FIG. 3B, the ITO material that may be used to form the electrode layer 140 may have a moisture vapor permeability higher than at least some of the layers included in the display panel 400. In an example, even if moisture from the outside environment is present inside the electrode layer 140 and/or at an interface of the electrode layer 140, the present moisture may be removed due, at least in part, to the higher moisture vapor permeability of the electrode layer 140. The electrode layer 140 may be configured to have a discontinuous interface, such that some portions of the electrode layer 140 may be disposed outside of the display panel 400 and other portions of the electrode layer 140 may be disposed inside of the display panel 400. Therefore, the moisture from the outside environment may be impeded or prevented from entering into the display panel 400 along the interface portion of the electrode layer 140. According to aspects of the invention, the electrode layer 140 may be a transparent electrode layer 140.

Referring to FIG. 2 again, portions of the electrode layer 140 may be removed from the surfaces of the protrusions 125 and partially removed from the first surface 121 of the light blocking layer 120 disposed outside the seal line area SA. Accordingly, the electrode layer 140 has discontinuous interface portions in the peripheral area PA.

At least the moisture barrier area BA may be formed or disposed outside the seal line area SA, more specifically, between the seal line area SA and the display area DA. In addition, the moisture barrier areas BA may be alternately arranged with the moisture trap areas TA in the seal line area SA.

When the image display device includes the liquid crystal device 300, the first display substrate 100 further includes a first alignment layer 150 disposed on the electrode layer 140.

The second display substrate 200 includes a second base substrate 210 and a protective layer 220 disposed on the second base substrate 210.

The second base substrate 210 may be a transparent glass substrate or a transparent flexible substrate and is disposed across from the first base substrate 110. Further, the second base substrate 210 may be oriented or configured, such that a larger surface of the second base substrate 210 may face a larger surface of the first base substrate 110.

The protective layer 220 may be configured to have a single-layer structure of an organic or inorganic insulating material, or a double-layer structure including a first protective layer (not shown) including an inorganic insulating material and a second protective layer (not shown) including an organic insulating material. The first protective layer and the second protective layer may be sequentially stacked on top of one another.

FIG. 2 illustrates the protective layer 220 having the single-layer structure. The protective layer 220 includes a plurality of openings 225 formed or disposed thereon in the seal line area SA. The openings 225 may be formed by removing portions of the protective layer 220. The contact area between the protective layer 220 and the coupling member 350 may be increased by the openings 225. In an example, the openings 225 may be disposed to respectively correspond to the protrusions 125.

The openings 225 are disposed in the seal line area SA and may expose a layer disposed under the protective layer 220. Although a layer interposed between the second base substrate 210 and the protective layer 220 is omitted in FIG. 2, aspects of the invention are not limited thereto, such that at least one of insulating layers, pad electrodes, and lines may be interposed between the second base substrate 210 and the protective layer 220.

Although not shown in figures, the protective layer 220 may have a concavo-convex shape in which a concave portion is recessed towards the second base substrate 210 and a convex portion is protruded towards the first base substrate 110. The concavo-convex shape may be repeatedly and alternately arranged with each other.

The second display substrate 200 may further include a pixel electrode layer (not shown) disposed on the protective layer 220 and a second alignment layer 230 disposed on the pixel electrode layer. The pixel electrode layer may include a transparent conductive oxide, e.g., indium tin oxide, indium zinc oxide, etc.

Although not shown in figures, the pixel electrode may be partially removed in the peripheral area PA to provide a plurality of moisture trap areas TA and a plurality of moisture barrier areas BA. For instance, the pixel electrode layer may be disposed in the openings 225 of the seal line area SA to provide the moisture trap areas TA, and the pixel electrode layer is removed on the protective layer 220 in the peripheral area PA to provide the moisture barrier areas BA.

The second alignment layer 230 is disposed on the pixel electrode layer and the protective layer 220 and faces the first alignment layer 150 while the liquid crystal device 300 is disposed between the first alignment layer 150 and the second alignment layer 230. Since the pixel electrode layer is disposed in the pixel area of the display area DA, which is not shown in FIG. 2, the second alignment layer 230 is disposed on the protective layer 220 of FIG. 2.

Figure 4:
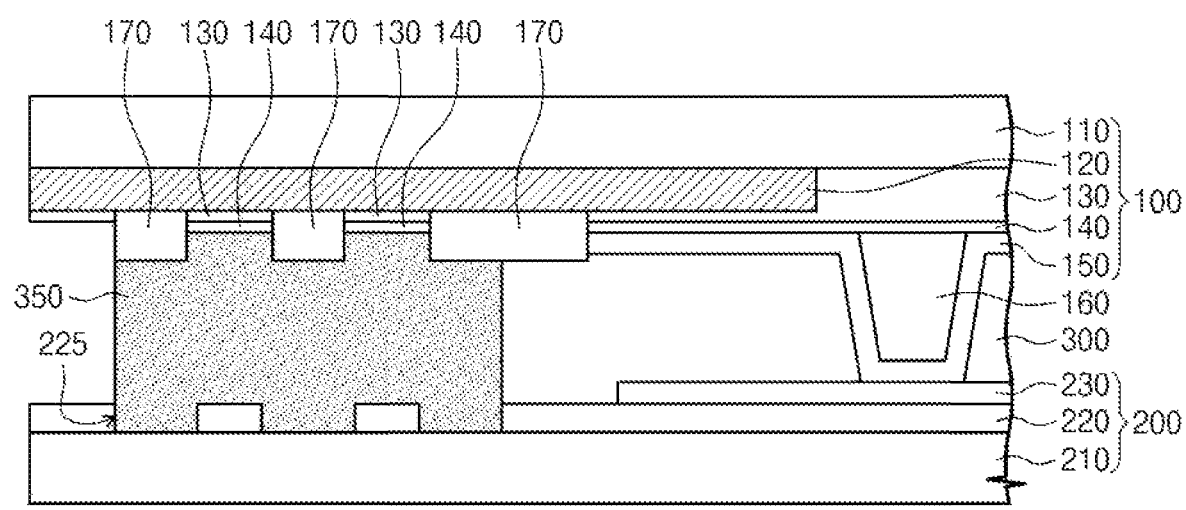
FIG. 4 is a cross-sectional view illustrating a display panel according to an exemplary embodiment of the present invention.

FIG. 4 is a cross-sectional view illustrating a display panel according to an exemplary embodiment of the present invention. In FIG. 4, the same reference numerals denote the same elements in FIG. 2, and thus detailed descriptions of the same elements will be omitted.

Referring to FIG. 4, a first display substrate 100 includes a first base substrate 110, a light blocking layer 120, an overcoating layer 130, an electrode layer 140, a column spacer 160, and a plurality of protrusions 170.

The light blocking layer 120 is disposed on the first base substrate 110. The light blocking layer 120 may be included in the peripheral area PA. The overcoating layer 130 is disposed to cover or overlap at least a portion of the light blocking layer 120 and the first base substrate 110. Further, the overcoating layer 130 may compensate for a step difference between the light blocking layer 120 and the first base substrate 110.

The electrode layer 140 is disposed on the overcoating layer 130. The electrode layer 140 may include a transparent conductive oxide, e.g., indium tin oxide (ITO).

Portions of the electrode layer 140 are removed in the peripheral area PA to provide a plurality of moisture trap areas TA and a plurality of moisture barrier areas BA. The moisture trap areas TA may include a portion of the electrode layer 140 disposed therein and the moisture barrier areas BA may remove or omit presence of the electrode layer 140.

According to aspects of the invention, the overcoating layer 130 may be disposed between the electrode layer 140 and the light blocking layer 120 in the moisture trap areas TA. Further, the overcoating layer 130 may be removed or omitted from the moisture barrier areas BA. The moisture barrier areas BA may be alternately arranged with the moisture trap area TA in the seal line area.

The column spacer 160 is disposed on the electrode layer 140. The column spacer 160 may provide a gap or distance (e.g., a cell gap) between the first display substrate 100 and the second display substrate 200. A height of the column spacer 160 may be based on the cell gap of the display panel 400. The first display substrate 100 and the second display substrate 200 may make contact with each other in the area in which the column spacer 160 is disposed.

The protrusions 170 may be disposed in the moisture barrier areas BA of the peripheral area PA. The protrusions 170 are disposed on the light blocking layer 120 in the moisture barrier areas BA. In an example, the protrusions 170 are disposed to respectively correspond to the openings 225 present in the protective layer 220 in the seal line area SA.

The protrusions 170 are disposed in the seal line area SA. Although a limited number of protrusion 170 are illustrated in FIG. 4, the number of the protrusions 170 illustrated as being disposed in the seal line area SA are note limited thereto.

The protrusions 170 may increase a contact area between the first display substrate 100 and the coupling member 350. The size of the contact area may exert influence on the adhesive strength between the coupling member 350 and the first display substrate 100. When the contact area increases, the adhesive strength may become stronger. More particularly, in a structure where the width of the coupling member 350 may not be sufficiently secured and a narrow bezel structure in which the width of the peripheral area PA may be reduced, the adhesive strength may be resistant or prevented from degradation since the contact area of the coupling member 350 with respect to the first display substrate 100 may be increased by the protrusions 170.

In an example, the protrusions 170 may include the same material as that of the column spacer 160.

Although not shown in FIG. 2 and FIG. 4, the coupling member 350 may be partially overlapped with the first alignment layer 150 and the second alignment layer 230 when viewed in a plan view.

Figure 5:
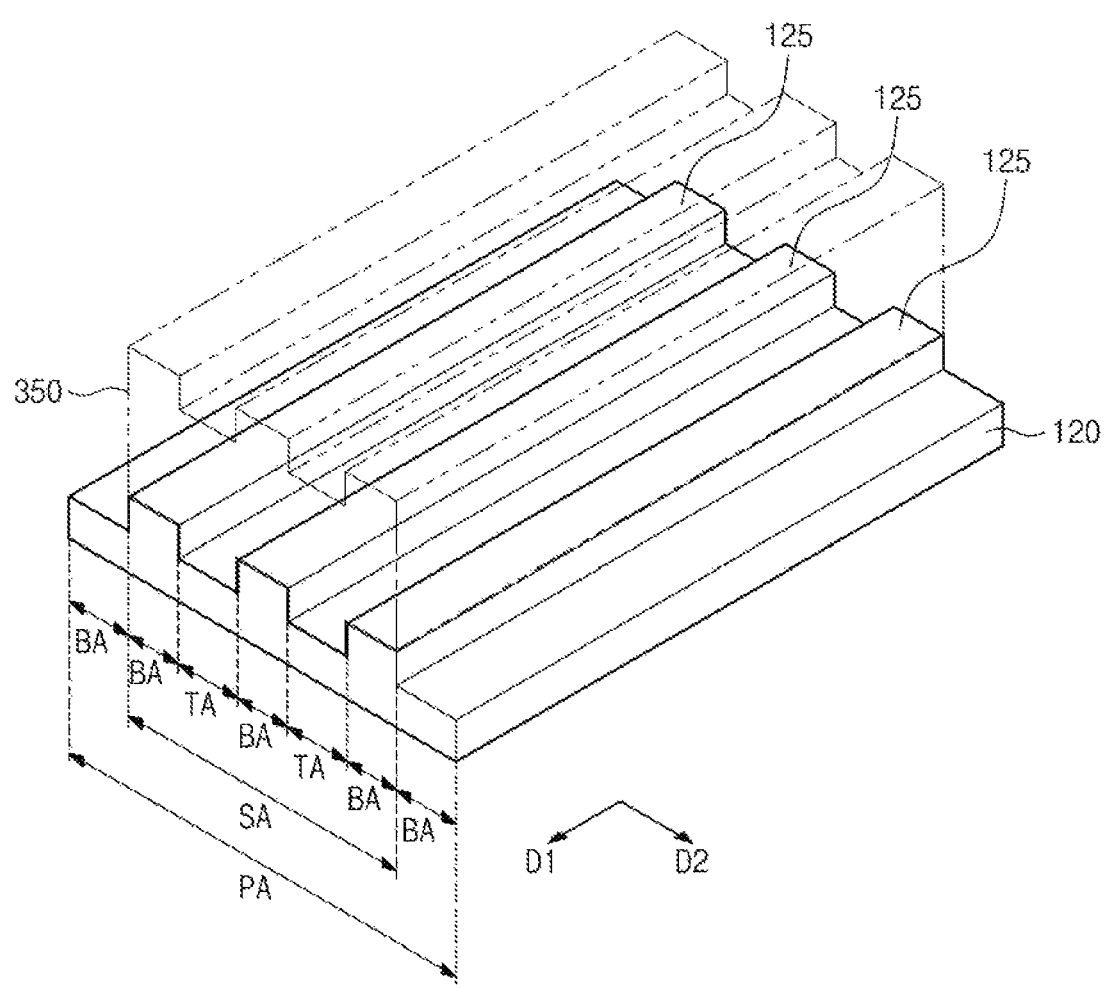
FIG. 5 is an enlarged perspective view illustrating a peripheral area of a display panel according to an exemplary embodiment of the present invention.

FIG. 5 is an enlarged perspective view illustrating a peripheral area of a display panel according to an exemplary embodiment of the present invention.

Referring to FIG. 5, the peripheral area PA of the display panel 400 includes the seal line area SA in which the coupling member 350 is disposed. The seal line area SA has a width smaller than that of the peripheral area PA.

As shown in FIG. 1, when the display panel 400 has a rectangular shape, the coupling member 350 may be disposed along the four sides of the display panel 400 and may extend substantially in parallel to adjacent sides thereto.

As shown in FIG. 5, the coupling member 350 extends in a first direction D1. A second direction D2 may be substantially normal or perpendicular to the first direction D1.

The moisture trap areas TA may be alternately arranged with the moisture barrier areas BA in the seal line area SA along the second direction D2. The moisture barrier areas BA may correspond to areas in which the electrode layer 140 is not disposed and the protrusions 125 are disposed in the moisture barrier areas BA. As illustrated in FIG. 5, the protrusions 125 extend in the first direction D1 to extend substantially in parallel to the coupling member 350.

Since the moisture barrier areas BA are alternately arranged with the moisture trap areas TA along the second direction D2, the moisture from the outside environment may be impeded or prevented from entering into the inside of the display panel 400 along the interface of the electrode layer 140.

According to aspects of the invention, the contact area between the first display substrate 100 and the coupling member 350 may be increased by the protrusions 125.

In addition, as lengths of the protrusions 125 are increased, the contact area between the first display substrate 100 and the coupling member 350 may also increase. Hereinafter, a method for increasing the length of the protrusion 125 will be described with reference to FIG. 6 and FIG. 7.

Figure 6:
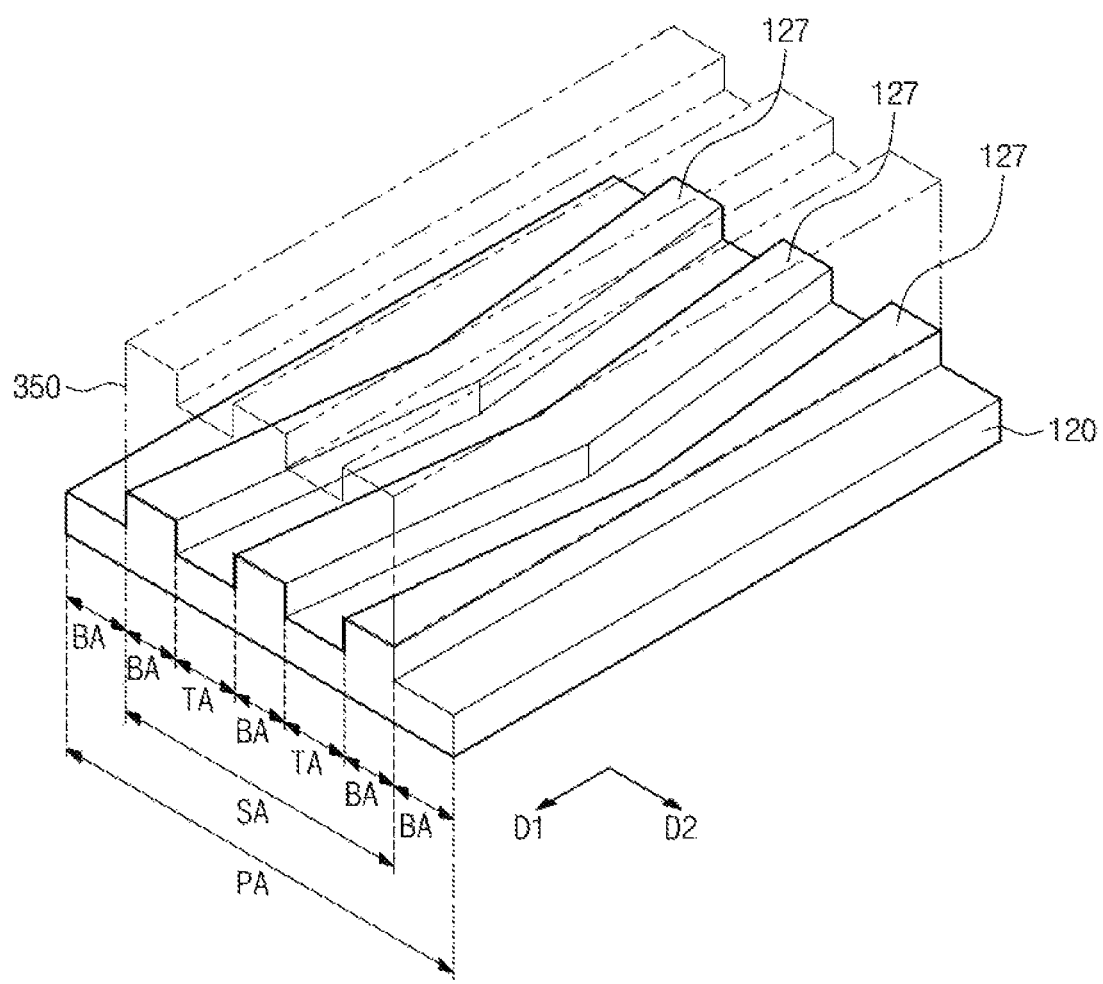
FIG. 6 is an enlarged perspective view illustrating a peripheral area of a display panel according to an exemplary embodiment of the present invention.
Figure 7:
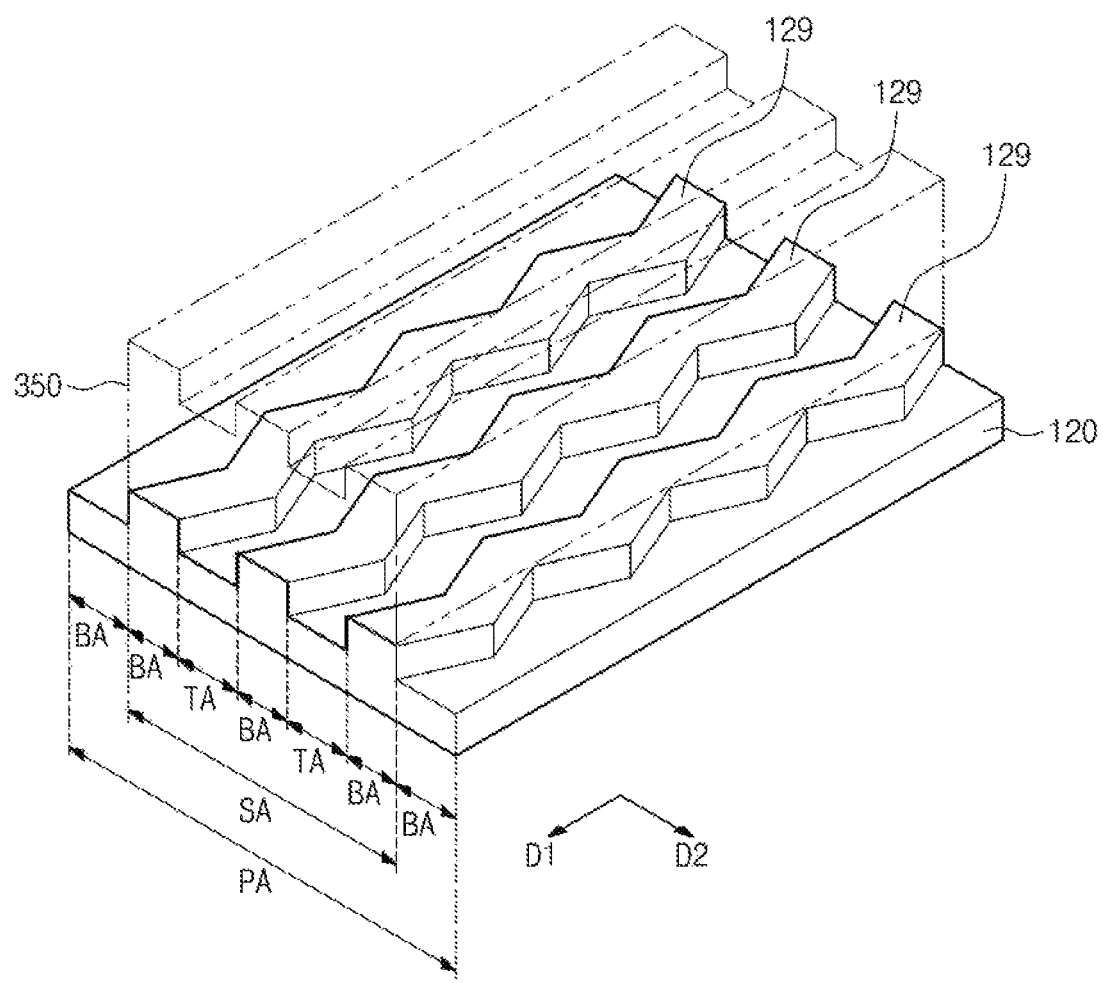
FIG. 7 is an enlarged perspective view illustrating a peripheral area of a display panel according to an exemplary embodiment of the present invention.

FIG. 6 is an enlarged perspective view illustrating a peripheral area of a display panel according to an exemplary embodiment of the present invention. FIG. 7 is an enlarged perspective view illustrating a peripheral area of a display panel according to an exemplary embodiment of the present invention.

Referring to FIG. 6, protrusions 127 disposed along the seal line area SA may have a bent shape or have a bent portion. Each of the protrusions 127 is bent in or towards the second direction D2 and may be bent in a counter-clockwise or different direction (e.g., at about 90 degrees) to be configured to have a V shape. More specifically, each of the protrusions 127 may extend in the first direction D1 and may be bent in a central or body region towards the second direction D2. Although protrusion portions having bent shapes are illustrated, aspects of the invention are not limited thereto, such that the protrusion portions may be configured to have similarly curved or rounded portions at various locations of the protrusion portions. Further, the protrusions may have bent portions at various angles and/or directions.

In an example, the protrusions 127 may have a length longer than the protrusions 125 of FIG. 5.

As shown in FIG. 7, protrusions 129 disposed along the seal line SA are bent several times in alternating directions, first towards the second direction D2 and then towards direction opposite from the second direction D2 to form a zigzag shape. More specifically, the protrusions 129 may extend in the first direction D1 and may bent in the second direction D2 to have a zigzag shape. Although protrusion portions having bent shapes are illustrated, aspects of the invention are not limited thereto, such that the protrusion portions may have curved or rounded portions in various directions.

According to aspects of the invention, the protrusions 129, when straightened, may have a length longer than the protrusions 125 of FIG. 5 and/or the protrusions 127 of FIG. 6.

Although various shapes of the protrusions were illustrated in FIG. 5, FIG. 6, and FIG. 7, aspects of the invention are not limited thereto.

FIG. 8A, FIG. 8B, FIG. 8C, FIG. 8D, FIG. 8E, FIG. 8F, FIG. 8G, and FIG. 8H illustrate a manufacturing process for a first display substrate according to an exemplary embodiment of the present invention.

Figure 8A:
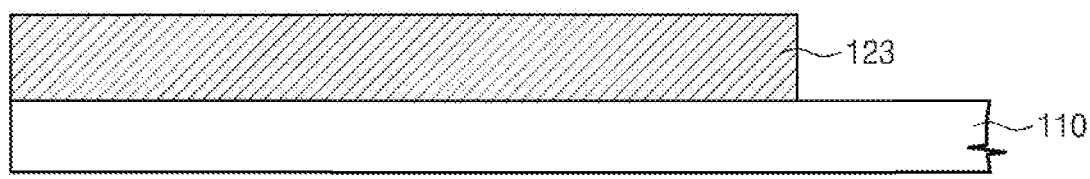
FIG. 8A, FIG. 8B, FIG. 8C, FIG. 8D, FIG. 8E, FIG. 8F, FIG. 8G, and FIG. 8H are views illustrating a manufacturing process for a display substrate according to an exemplary embodiment of the present invention.

Referring to FIG. 8A, an organic material 123 having a light blocking property is formed or disposed on the first base substrate 110. In an example, the organic material 123 may include a black or other color dye to block or impede at least some of the light passing therethrough. Height of the organic material 123 may be determined based on the height of the protrusion portions that may be configured, etched, or patterned from the organic material 123, such as protrusions 125 of FIG. 2.

Figure 8B:
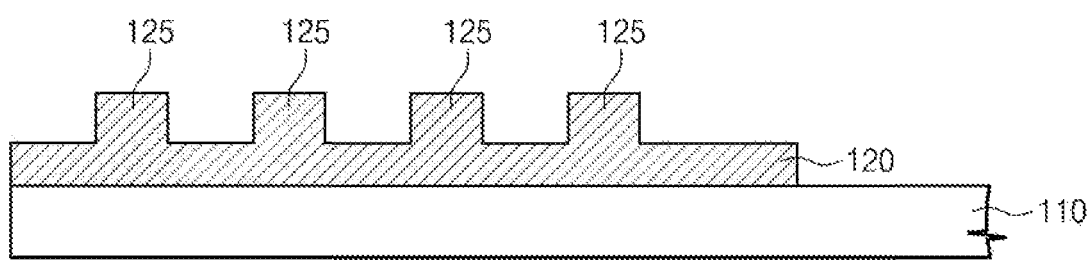

According to aspects of the invention, the organic material 123 may be patterned by, for example, a photolithography process to form or produce the light blocking layer 120 having a plurality of protrusions 125 protruding from the light blocking layer 120 as illustrated in FIG. 8B. Although not shown in figures, a photoresist layer may be disposed on the organic material 123 and a halftone mask or a slit mask may be disposed above the photoresist layer. A halftone area or a slit area may be formed in the halftone mask or the slit mask, such that the areas in which the protrusions 125 are formed may be exposed to a light source.

The light blocking layer 120 may be thicker in the areas in which the protrusions 125 are formed in comparison to areas of the light blocking layer 120 that does not have the protrusions 125 disposed thereon.

Figure 8C:
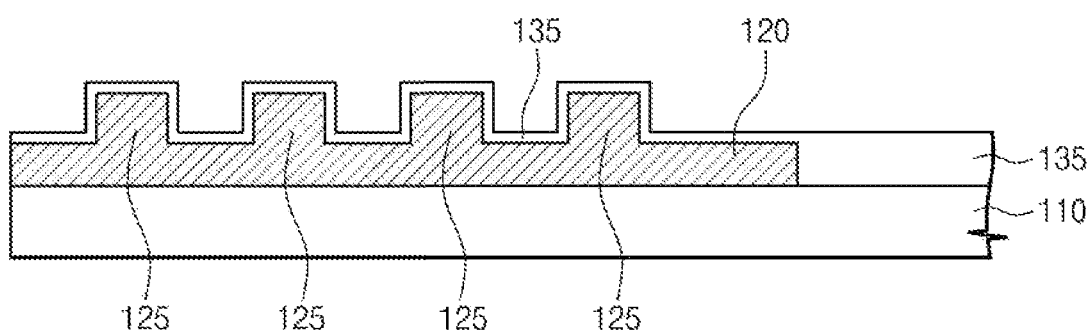
Figure 8D:
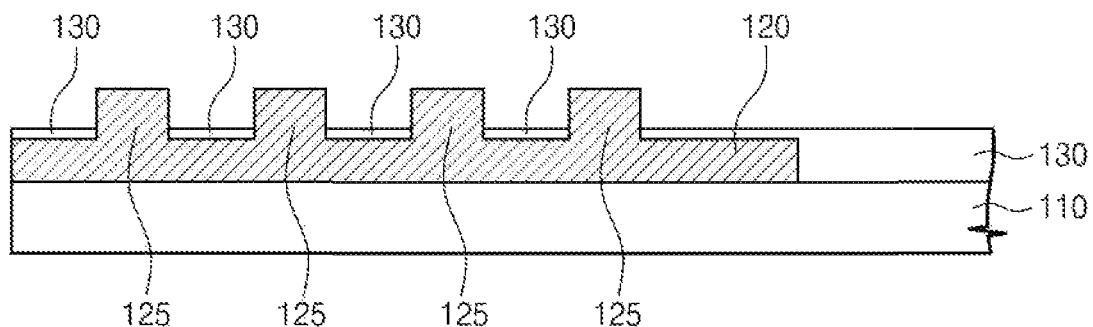

Referring to FIG. 8C, an overcoating material 135 is disposed on the first base substrate 110, the light blocking layer 120, and the protrusions 125. Once disposed, portions of the overcoating material 135 may be etched by an etching process. More specifically, portions of the overcoating material 135, which were disposed on the protrusions 125, may be removed via the etching process. The overcoating material 135 that was disposed on the portions of the light blocking layer 120 that does not have protrusions 125 may remain disposed after the etching process. The processed overcoating material 135 may be referred to as an overcoating layer 130, which may be formed or disposed on the first base substrate 110 and the light blocking layer 120 as shown in FIG. 8D.

Figure 8E:
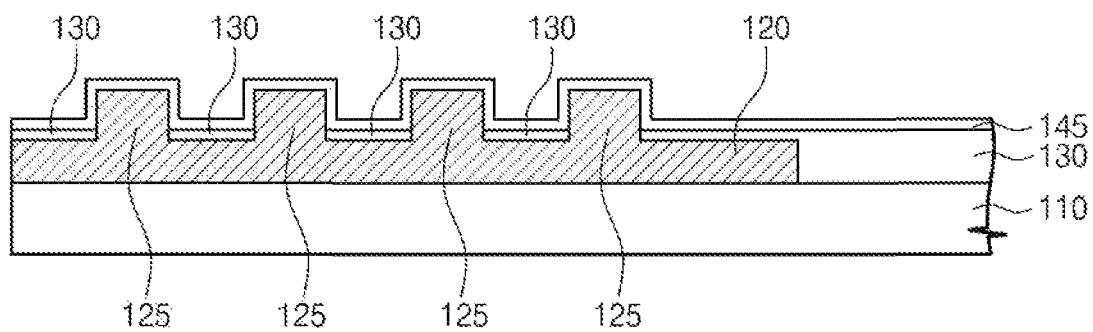

Referring to FIG. 8E, a transparent conductive oxide material 145 is formed or disposed on the overcoating layer 130 and the protrusions 125. The transparent conductive oxide material 145 may include, without limitation, ITO.

Figure 8F:
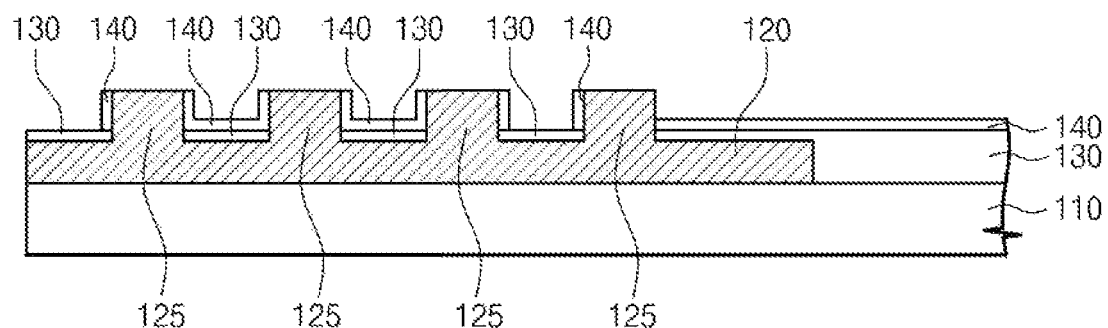

Referring to FIG. 8F, once disposed, the transparent conductive oxide material 145 may be patterned or processed to form an electrode layer 140. More specifically, once the transparent conductive oxide material 145 is initially disposed over the overcoating layer 130, portions of the transparent conductive oxide material 145 may be removed (e.g., via an etching process) to provide the electrode layer 140 configured as illustrated in FIG. 8F.

According to aspects of the invention, when the electrode layer 140 is patterned in the display area DA, portions of the transparent conductive oxide material 145 disposed in the peripheral area PA may be substantially simultaneously, or within a reference time frame, patterned, etched, or processed when the transparent conductive oxide material 145 disposed in the display area DA is patterned, etched, or processed. Thus, the moisture trap areas TA of FIG. 2 in which the electrode layer 140 may be formed or disposed and the moisture barrier areas BA of FIG. 2 from which the electrode layer 140 is removed may be formed or configured.

However, when the electrode layer 140 is not patterned in the display area DA, portions of the electrode layer 140 may be removed from areas corresponding to the moisture barrier areas BA in the peripheral area PA, for example, by a laser beam process.

Accordingly, the moisture barrier areas BA may be alternately arranged with the moisture trap areas TA in the seal line area SA.

Figure 8G:
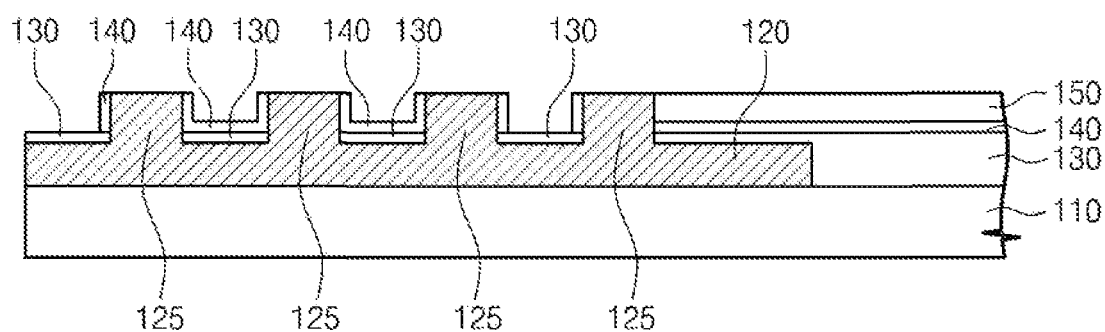

Referring to FIG. 8G, the first alignment layer 150 is formed or disposed on a portion of the electrode layer 140 to complete the first display substrate 100.

Figure 8H:
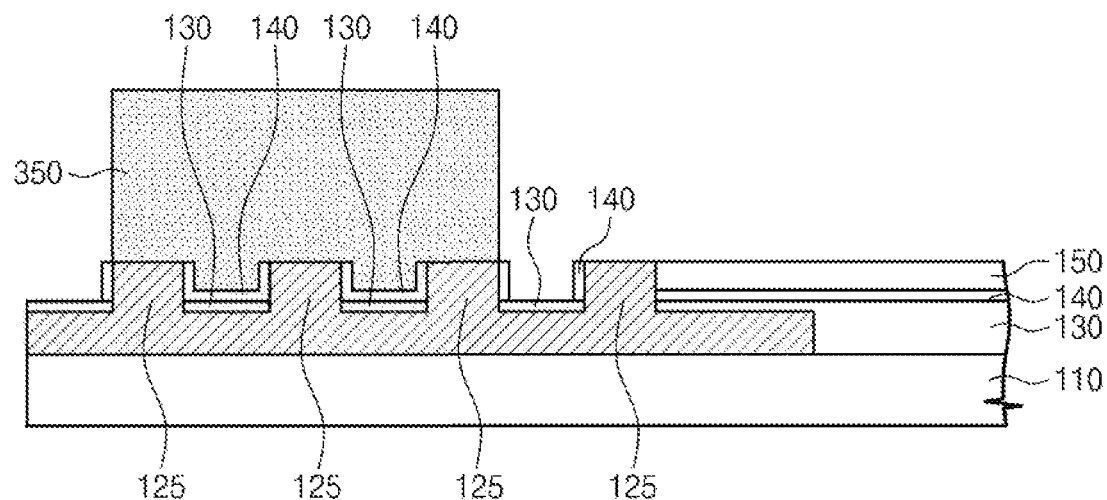

Referring to FIG. 8H, the coupling member 350 is formed or disposed on a portion of the first display substrate 100 in the seal line area SA.

The contact area between the coupling member 350 and the first display substrate 100 may be increased by the protrusions 125. Therefore, although the width of the coupling member 350 may be reduced, the contact area may be not reduced, or even increased, using the protrusions 125.

Although the coupling member 350 and the first alignment layer 150 are illustrated as being spaced apart from each other, aspects of the invention are not limited thereto, such that the coupling member 350 and the first alignment layer 150 may be partially overlap one another.

FIG. 9A, FIG. 9B, FIG. 9C, FIG. 9D, FIG. 9E, FIG. 9F, and FIG. 9G illustrate a manufacturing process of a display substrate according to exemplary embodiments of the present invention.

Figure 9A:
FIG. 9A, FIG. 9B, FIG. 9C, FIG. 9D, FIG. 9E, FIG. 9F, and FIG. 9G are views illustrating a manufacturing process for a display substrate according to an exemplary embodiment of the present invention.

Referring to FIG. 9A, the light blocking layer 120 is disposed on the first base substrate 110.

Figure 9B:
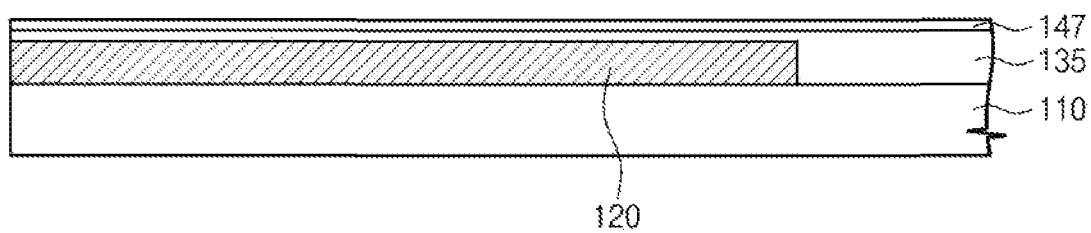
Figure 9C:
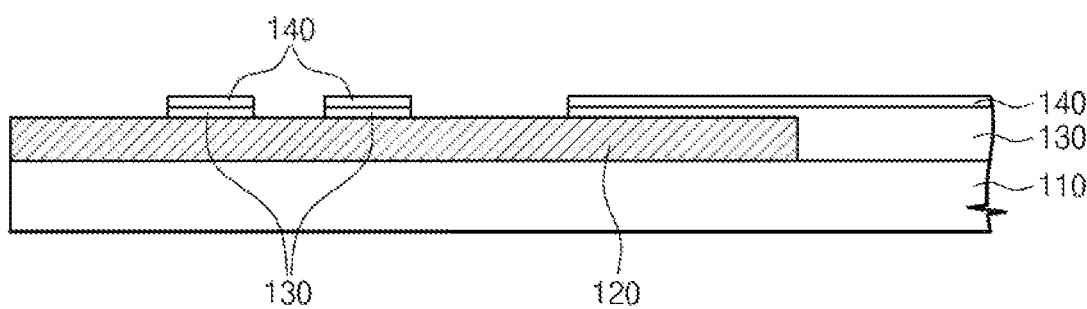

As shown in FIG. 9B, an overcoating material 135 and a transparent conductive oxide material 147 are formed or disposed on the first base substrate 110 and the light blocking layer 120. Portions of the overcoating material 135 and the transparent conductive oxide material 147 may be removed in the seal line area SA, for example, through a photolithography process and/or an etching process. More particularly, portions of the overcoating material 135 and the transparent conductive oxide material 147 may be removed or processed from areas corresponding to the moisture barrier areas of the peripheral area to form or produce an overcoating layer 130 and an electrode layer 140 illustrated in FIG. 9C.

Figure 9D:
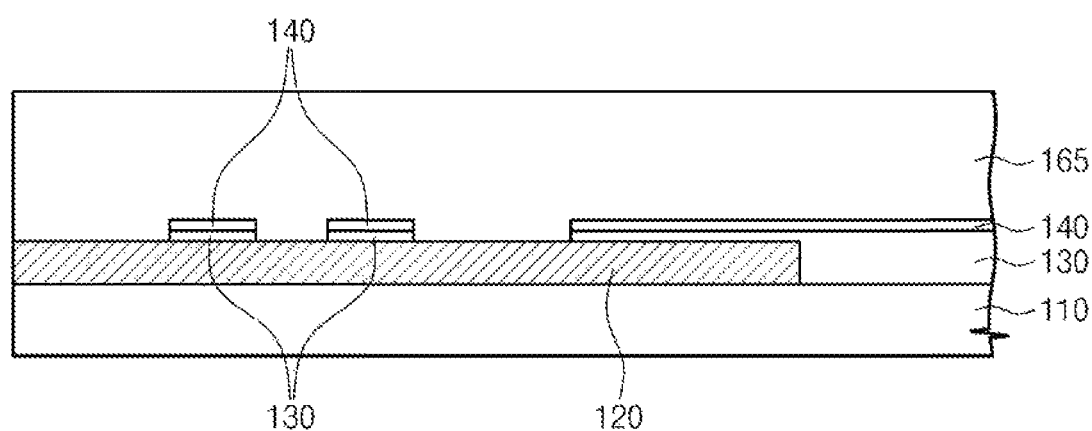

Referring to FIG. 9D, a spacer material 165 is disposed on the electrode layer 140. The spacer material 165 may include, without limitation, an organic insulating material.

Figure 9E:
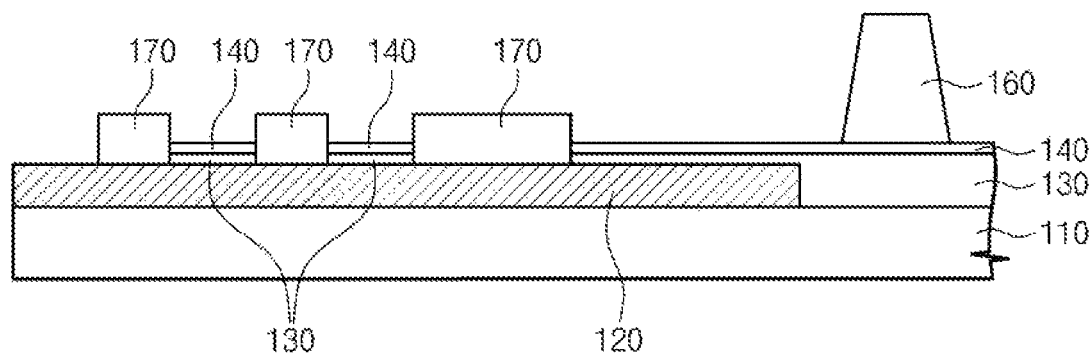

Referring to FIG. 9E, the spacer material 165 may be patterned, or portions thereof may be removed or processed to form or produce the column spacer 160 in the display area and the protrusions 170 in the peripheral area.

According to aspects of the invention, the column spacer 160 may have a height greater than that of the protrusions 170. Although not shown in figures, a photoresist layer may be disposed on the spacer material 165 and a halftone mask or a slit mask may be disposed above the photoresist layer. A halftone area or a slit area may be formed or configured in the halftone mask or the slit mask such that the areas in which the protrusions 170 are formed or disposed may be exposed to a light source.

The protrusions 170 having a thickness smaller than that of the column spacer 160 may be formed or disposed in the peripheral area.

Figure 9F:
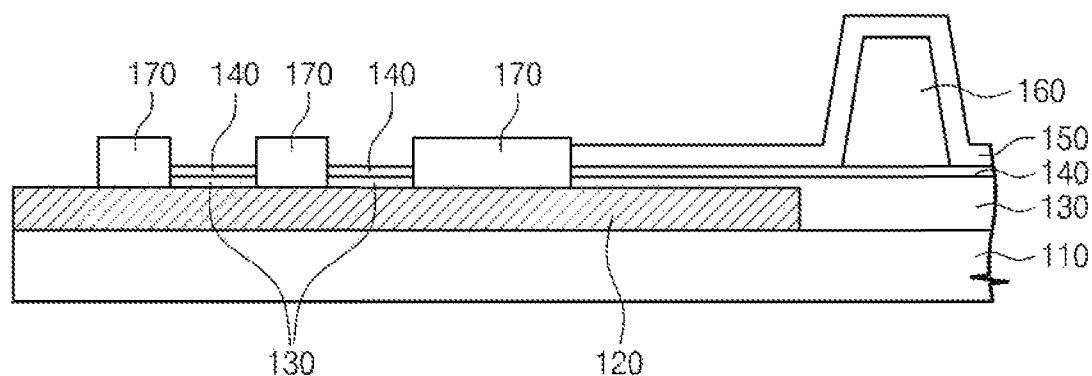

Referring to FIG. 9F, the first alignment layer 150 is formed or disposed on portions of the electrode layer 140 and the column spacer 160.

Figure 9G:
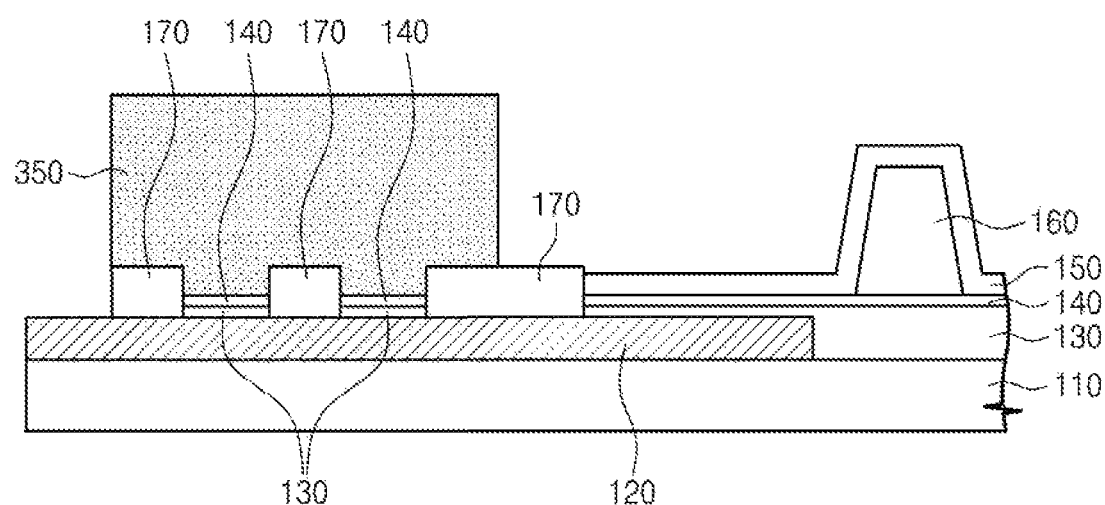

Referring to FIG. 9G, the coupling member 350 is formed or disposed on the first display substrate 100 to correspond to the seal line area SA.

The contact area between the coupling member 350 and the first display substrate 100 may be increased by the protrusions 170. Therefore, although the width of the coupling member 350 may be reduced, the contact area may be not reduced, or even increased, using the protrusions 170.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a display panel, comprising:
    disposing a first display substrate;
    disposing a second display substrate;
    interposing a display element between the first display substrate and the second display substrate;
    interposing a coupling member in a seal line area between the first display substrate and the second display substrate;
    interposing a contact structure between the coupling member and the first display substrate in the seal line area, the contact structure having a concavo-convex shaped surface in contact with the coupling member, and the contact structure includes a moisture trap area corresponding to concave shaped portions of the contact structure and a moisture barrier area corresponding to convex shaped portions of the contact structure;
    disposing an overcoating layer only on the moisture trap area of the contact structure; and
    disposing an electrode layer having a higher moisture vapor permeability than the overcoating layer and the coupling member only on the moisture trap area of the contact structure, wherein the electrode layer overlaps the coupling member in the seal line area.

2. The method of claim 1, wherein the contact structure comprises:
    a light blocking layer; and
    a plurality of protrusions disposed on the light blocking layer.

3. The method of claim 1, wherein the first display substrate comprises:
    a light blocking layer disposed on a first base substrate that includes a display area and a peripheral area.

4. The method of claim 1, wherein the electrode layer comprises a transparent conductive oxide.

5. The method of claim 2, wherein the first display substrate further comprises:
- a column spacer to maintain a distance between the first display substrate and the second display substrate, and the contact structure comprises a same material as the column spacer,
- wherein at least one of the protrusions has a height smaller than the column spacer.

6. A method for manufacturing a display panel, comprising:
- disposing a first display substrate defining a display area and a periphery area adjacent to the display area;
- disposing a second display substrate;
- interposing a coupling member between the first display substrate and the second display substrate, wherein the coupling member overlaps the periphery area and includes a concave shaped surface and a convex shaped surface;
- interposing a light blocking layer between the coupling member and the first display substrate, wherein the light blocking layer overlaps the periphery area and includes a concavo-convex shaped surface in contact with the coupling member; and
- forming an electrode layer between the light blocking layer and the coupling member, wherein the electrode layer is disposed only on a concave shaped surface of the concavo-convex shaped surface of the light blocking layer,
- wherein the electrode layer has a higher moisture vapor permeability than the coupling member so as to form a moisture trap.

7. The method of claim 1, wherein the electrode layer comprises indium tin oxide (ITO).

8. The method of claim 6, wherein the electrode layer comprises indium tin oxide (ITO).

* * * * *